US006690657B1

(12) United States Patent
Lau et al.

(10) Patent No.: US 6,690,657 B1
(45) Date of Patent: Feb. 10, 2004

(54) MULTICHANNEL DISTRIBUTED WIRELESS REPEATER NETWORK

(75) Inventors: Kam Y. Lau, Danville, CA (US); Iason Vassiliou, Berkeley, CA (US); Mahesh Venkatraman, Redwood City, CA (US)

(73) Assignees: Berkeley Concept Research Corporation, San Jose, CA (US); Kawasaki Microelectronics, Inc., Chiba (JP)

( * ) Notice: Subject to any disclaimer, the term of this patent is extended or adjusted under 35 U.S.C. 154(b) by 0 days.

(21) Appl. No.: 09/513,367

(22) Filed: Feb. 25, 2000

(51) Int. Cl.$^7$ .................................................. H04J 1/00
(52) U.S. Cl. ........................................ 370/315; 370/319
(58) Field of Search ................................. 370/274, 279, 370/293, 315, 319, 320, 321, 492, 344

(56) References Cited

U.S. PATENT DOCUMENTS

| | | | |
|---|---|---|---|
| 4,198,600 A | * 4/1980 | Oguchi et al. | 455/15 |
| 4,367,458 A | 1/1983 | Hackett | 340/539 |
| 4,509,199 A | 4/1985 | Ichihara | 455/7 |
| 4,539,706 A | * 9/1985 | Mears et al. | |
| 4,713,809 A | * 12/1987 | Mizota | |
| 4,750,036 A | 6/1988 | Martinez | 358/147 |
| 4,794,649 A | * 12/1988 | Fujiwara | |
| 4,835,604 A | 5/1989 | Kondo et al. | 358/86 |
| 4,930,118 A | 5/1990 | Sugihara | 370/16 |
| 5,038,342 A | 8/1991 | Crisler et al. | 370/50 |
| 5,040,175 A | 8/1991 | Tuch et al. | 370/85.2 |
| 5,181,200 A | 1/1993 | Harrison | 370/85.1 |
| 5,276,703 A | 1/1994 | Budin et al. | 375/1 |
| 5,321,542 A | 6/1994 | Freitas et al. | 359/172 |
| 5,325,419 A | 6/1994 | Connolly et al. | 379/60 |
| 5,349,463 A | 9/1994 | Hirohashi et al. | 359/174 |
| 5,388,102 A | 2/1995 | Griffith et al. | 370/105.1 |
| 5,400,327 A | 3/1995 | Dezonno | 370/62 |
| 5,440,613 A | 8/1995 | Fuentes | 379/60 |
| 5,452,291 A | 9/1995 | Eisenhandler et al. | 370/54 |

(List continued on next page.)

FOREIGN PATENT DOCUMENTS

EP  0777343 A2  6/1997

OTHER PUBLICATIONS

Xinhua Feng, "Home Networking," Nov. 14, 1999, pp. 1–20.

Clay Gump, "Unlicensed National Information Infrastructure—The Road to Regulating Unlicensed Spectrum," May 12, 1997, pp. 1–14.

(List continued on next page.)

*Primary Examiner*—Kenneth Vanderpuye
(74) *Attorney, Agent, or Firm*—Marger Johnson & McCollom

(57) ABSTRACT

A multichannel distributed wireless repeater network, methods for its operation, and system components are disclosed. The network is designed to facilitate high-bit-rate data communication within a home, office, or similarly constrained area. According to the described embodiments, RF radiation outside of the desired network area can be minimized by use of low power transmitter and repeaters, while short paths and uniform signal strength within the network area predominate, facilitating high bit rates.

The network utilizes low-power RF transmitters that generally have insufficient power to reliably span the entire network of receivers. To provide uniform coverage throughout the network, channel-shifting repeaters are used. These repeaters pick up a transmitted (or retransmitted) signal on one channel, shift it to a substantially non-interfering channel, and retransmit the signal. The receivers can preferably receive signals on the best available channel, whether it be the original channel or a repeating channel.

40 Claims, 11 Drawing Sheets

U.S. PATENT DOCUMENTS

| | | | | |
|---|---|---|---|---|
| 5,463,623 A | | 10/1995 | Grimes et al. | 370/79 |
| 5,473,602 A | | 12/1995 | McKenna et al. | 370/60 |
| 5,509,028 A | * | 4/1996 | Marque-Pucheu | |
| 5,515,378 A | | 5/1996 | Roy, III et al. | 370/95.1 |
| 5,553,126 A | | 9/1996 | Tang | 379/185 |
| 5,555,258 A | | 9/1996 | Snelling et al. | 370/29 |
| 5,563,889 A | | 10/1996 | Gard et al. | 370/95.1 |
| 5,564,121 A | | 10/1996 | Chow et al. | 455/53.1 |
| 5,579,308 A | | 11/1996 | Humpleman | 370/58.1 |
| 5,592,470 A | | 1/1997 | Rudrapatna et al. | 370/320 |
| 5,598,412 A | | 1/1997 | Griffith et al. | 370/352 |
| 5,608,449 A | | 3/1997 | Swafford, Jr. et al. | 348/13 |
| 5,613,191 A | | 3/1997 | Hylton et al. | 455/3.1 |
| 5,630,204 A | | 5/1997 | Hylton et al. | 455/3.3 |
| 5,636,211 A | | 6/1997 | Newlin et al. | 370/465 |
| 5,638,371 A | | 6/1997 | Raychaudhuri et al. | 370/347 |
| 5,642,151 A | | 6/1997 | Nusbickel et al. | 348/6 |
| 5,642,353 A | | 6/1997 | Roy, III et al. | 370/329 |
| 5,678,177 A | | 10/1997 | Beasley | 455/16 |
| 5,684,801 A | * | 11/1997 | Amitay et al. | |
| 5,697,063 A | | 12/1997 | Kishigami et al. | 455/53.1 |
| 5,708,961 A | | 1/1998 | Hylton et al. | 455/4.2 |
| 5,722,041 A | | 2/1998 | Freadman | 455/6.3 |
| 5,726,984 A | | 3/1998 | Kubler et al. | 370/349 |
| 5,734,643 A | * | 3/1998 | Rondeau | |
| 5,742,608 A | | 4/1998 | Randrianaliminana et al. | 370/447 |
| 5,742,640 A | | 4/1998 | Haoui et al. | 375/220 |
| 5,745,483 A | | 4/1998 | Nakagawa et al. | 370/335 |
| 5,757,792 A | | 5/1998 | Aoki | 370/347 |
| 5,771,275 A | | 6/1998 | Brunner et al. | 379/67 |
| 5,781,856 A | | 7/1998 | Jacobs et al. | 455/403 |
| 5,784,683 A | | 7/1998 | Sistanizadeh et al. | 455/5.1 |
| 5,794,116 A | | 8/1998 | Matsuda et al. | 455/5.1 |
| 5,796,715 A | | 8/1998 | Patterson et al. | 370/60 |
| 5,796,727 A | | 8/1998 | Harrison et al. | 370/338 |
| 5,805,582 A | | 9/1998 | Snelling et al. | 370/337 |
| 5,812,541 A | | 9/1998 | Fuentes et al. | 370/335 |
| 5,812,930 A | | 9/1998 | Zavrel | 455/5.1 |
| 5,812,933 A | | 9/1998 | Niki | 455/16 |
| 5,815,795 A | | 9/1998 | Iwai | 455/9 |
| 5,818,512 A | | 10/1998 | Fuller | 348/8 |
| 5,818,830 A | | 10/1998 | Daane et al. | 370/347 |
| 5,828,658 A | | 10/1998 | Ottersten et al. | 370/310 |
| 5,832,365 A | | 11/1998 | Chen et al. | 455/15 |
| 5,838,226 A | | 11/1998 | Houggy et al. | 340/310.01 |
| 5,845,211 A | | 12/1998 | Roach, Jr. | 455/436 |
| 5,848,054 A | | 12/1998 | Mosebrook et al. | 370/226 |
| 5,850,209 A | | 12/1998 | Lemke et al. | 345/156 |
| 5,872,784 A | | 2/1999 | Rostoker et al. | 370/395 |
| 5,873,031 A | | 2/1999 | Griffith et al. | 455/412 |
| 5,874,903 A | | 2/1999 | Shuey et al. | 340/870.02 |
| 5,875,209 A | | 2/1999 | Ogata | 375/211 |
| 5,880,721 A | | 3/1999 | Yen | 345/327 |
| 5,880,732 A | | 3/1999 | Tryding | 345/352 |
| 5,883,884 A | * | 3/1999 | Atkinson | |
| 5,886,732 A | | 3/1999 | Humpleman | 348/10 |
| 5,886,989 A | | 3/1999 | Evans et al. | 370/347 |
| 5,892,796 A | | 4/1999 | Rypinski | 375/232 |
| 5,903,293 A | | 5/1999 | Nikkels et al. | 347/86 |
| 5,903,322 A | | 5/1999 | Chen | 348/723 |
| 5,905,719 A | | 5/1999 | Arnold et al. | 370/330 |
| 5,907,545 A | | 5/1999 | Arai et al. | 370/342 |
| 5,907,794 A | * | 5/1999 | Lehmusto et al. | |
| 5,915,206 A | | 6/1999 | Diehl et al. | 455/6.3 |
| 5,924,022 A | | 7/1999 | Beasley et al. | 455/218 |
| 5,930,240 A | | 7/1999 | Wichman | 370/315 |
| 5,936,949 A | | 8/1999 | Pasternak et al. | 370/328 |
| 5,936,965 A | | 8/1999 | Doshi et al. | 370/469 |
| 5,940,387 A | | 8/1999 | Humpleman | 370/352 |
| 5,940,763 A | | 8/1999 | Alperovich et al. | 455/450 |
| 5,943,046 A | | 8/1999 | Cave et al. | 345/327 |
| 5,943,342 A | | 8/1999 | Tawa | 370/466 |
| 5,949,790 A | | 9/1999 | Pehkonen et al. | 370/465 |
| 6,038,267 A | | 3/2000 | Oura et al. | 375/329 |
| 6,041,065 A | * | 3/2000 | Melvin | 370/492 |
| 6,097,707 A | * | 8/2000 | Hodzic et al. | |
| 6,125,109 A | * | 9/2000 | Fuerter | 370/315 |
| 6,377,612 B1 | * | 4/2002 | Baker | 375/141 |

OTHER PUBLICATIONS

"Bluetooth Specification Version 1.0B—Part A: Radio Specification", Nov. 29, 1999, pp. 17–32.

Peter Rysavy, "Planning and Implementing Wireless LANS," Feb. 8, 2000, pp. 1–3.

"Technical Summary of the SWAP Specification," Mar. 1998, p. 1.

Stephen Manes, "Digital Tools," Feb. 7, 2000, p. 140 and 142.

"Bluetooth Specification Version 1.0B—Part B: Baseband Specification", Nov. 29, 1999, pp. 35–184.

Multiband Distributed Wireless Repeater Network, Appendix A: Operation of Repeater Network Using Separate RF Control Channel, 2 pages.

Federal Communications Commission, "Memorandum Opinion and Order," Released: Jun. 24, 1998, pp. 1–21.

* cited by examiner

MULTICHANNEL DISTRIBUTED WIRELESS REPEATER NETWORK

RELATED APPLICATION DATA

This application claims priority from U.S. Provisional Application No. 60/121,554, filed Feb. 25, 1999, and from U.S. Provisional Application No. 60/147,616, filed Aug. 6, 1999, and U.S. Provisional Application No. 60/147,617, filed Aug. 6, 1999.

FIELD OF THE INVENTION

This invention pertains generally to local area networks, and more particularly to methods and apparatus for implementing a distributed wireless local area network.

BACKGROUND OF THE INVENTION

The flow of a wide variety of electronic information within the boundaries of a home or office has become a reality in today's society. What began perhaps with a simple voice telephone line connection to the outside world has expanded to include cable television, digital television, telephone modems, satellite links, cable modems, ISDN (Integrated Services Digital Network) connections, DSL (Digital Subscriber Line) connections, local area networks, sophisticated security systems, intercom systems, multi-speaker "surround sound" entertainment, smart appliances and smart "houses", etc. New technology will almost certainly expand the future uses for information distribution within the confines of a house or office.

With enough foresight, a new home or office can be equipped with what may be literally miles of wiring, to allow flexible configuration of a home or office to receive and distribute several (or perhaps all) of these forms of information. But once the walls are in place, adding wiring for a new technology, repairing wiring already in place, or even moving existing equipment to a new desired equipment location with no "outlet", may be reduced to choosing between either expensive remodeling or unsightly wiring running along baseboards and window sills. Furthermore, because most of these technologies require their own particular wiring and signaling requirements, a variety of wall sockets and wiring are required, all adding to the expense of construction and detracting from the aesthetics of the space.

Other problems with wired networks exist. For example, merging of multiple differing networks for centralized control, etc., requires expensive bridging, or bridges may not be available at all.

To combat these problems, wireless networks are now being designed for home use. Many of these networks work in the Industrial, Scientific, and Medical (ISM) band that exists at 2.400–2.4835 GHz. A second possible ISM band exists at 5.725–5.850 GHz. These bands allow unlicensed operation, as they are "garbage" bands that are generally unsuitable for commercial broadcast use (microwave ovens, for example, operate in the 2.4 GHz band). Although low-power, narrowband signals may be jammed by the noise occurring in these bands, digital spread spectrum techniques can be used to effect useful bandwidth.

The Federal Communication Commission has recently created an Unlicensed National Information Infrastructure (U-NII) to further address the needs for wireless digital data communications, particularly for wireless transmission at a rate that can support multimedia. U-NII released three 100 MHz bands for use: 5.15–5.25 GHz, for indoor use only and at low power, suitable for short ranges such as within a room; 5.25–5.35 GHz, at an intermediate power for mid-range uses; and 5.725–5.825 GHz (overlapping the 5.7 GHz ISM band), at a higher power for use up to several miles. U-NII power requirements are designed to encourage wideband uses over narrowband uses, by specifying an allowable transmit power formula that reduces maximum output power logarithmically as signal bandwidth is reduced.

Within the ISM and U-NII bandwidth constraints, several network concepts have been designed, most notably the IEEE 802.11 format, the Bluetooth™ format, and the Shared Wireless Access Protocol (SWAP) developed by the HomeRF Working Group. Each of these formats is designed for use in the 2.4 GHz ISM band. IEEE 802.11 format allows for data rates of 1 million bits per second (Mbps), 2 Mbps, and 11 Mbps, uses either Frequency Hopped Spread Spectrum (FHSS) or Direct Sequence Spread Spectrum (DSSS) to overcome noise, and has an operational range of about 40 m. SWAP allows for data rates of 1 or 2 Mbps, uses FHSS, and has an operational range of about 50 m. Bluetooth™ format allows for a 1 Mbps data rate, uses FHSS, and allows for several operational ranges, depending on the power "class" of the transceiver; the main applications for Bluetooth™, however, envision the lowest power class transceiver, which has about a 10 m range.

In the IEEE 802.11 format, an "ad-hoc" network structure is envisioned. Each transceiver uses Carrier Sense Multiple Access/Collision Avoidance (CSMA/CA), i.e., it listens for quiet on the channel before it transmits. FIG. 1 illustrates an CSMA/CA "ad-hoc" network formed with transceivers 20, 22, 24, and 26. Each transceiver can communicate with each other transceiver that is within its range, whenever the channel is not already in use. Problems can arise when two transceivers that are out of each other's range (e.g., 20 and 26 in FIG. 1) cannot detect each other's transmissions, and attempt to communicate simultaneously using the channel. This system also functions poorly with time-critical information, such as multimedia or voice.

SWAP is similar to IEEE 802.11 in many respects. But SWAP provides two access models, a Time Division Multiple Access (TDMA) service for time-critical data, and a CSMA/CA service for asynchronous data delivery. SWAP can work as an ad-hoc network as shown in FIG. 1. When time-critical services are in use, however, a Connection Point is required. The Connection Point coordinates the TDMA service such that sufficient bandwidth is reserved for the time-critical services. This system's TDMA mode overcomes some of the problems of IEEE 802.11, although bandwidth is more limited.

FIG. 2 illustrates the more structured wireless concept employed by Bluetooth™, as described in the Bluetooth Specification Version 1.0B, Nov. 29, 1999. The Bluetooth™ unit of network service is termed apiconet, e.g., 46, 48, 50, each of which comprises one master transceiver (28, 34, 40, respectively) and up to seven slave transceivers. Within each piconet, a FHSS channel and phase is established by the master, unique to that master. TDMA is used with 625 microsecond timeslots, with the master communicating in even-numbered time slots. In odd-numbered time-slots, the slave last addressed by the master is allowed to communicate. Each time-slot, the frequency for the piconet is hopped to the next in the hopping sequence established by the master. Slave transceivers follow the hop sequence for that piconet, communicating with the master when allowed by the master.

A scatternet 52 is a group of piconets with overlapping coverage areas. Because each piconet operates on a different FHSS channel, frequency conflicts are infrequent. When conflicts do occur, each piconet may lose a single packet. Although a single transceiver is allowed to be a master in one piconet and a slave in another (e.g., transceiver 34), or a slave in two piconets (e.g., transceiver 38), effective dual-piconet operation can be difficult to establish and maintain, since the specification establishes that overlapping piconets shall not be time- or frequency-synchronized. Furthermore, although a transceiver may have visibility in two piconets, this does not establish visibility between other transceivers in overlapped piconets. Each connection in each piconet allows only for communication between that piconet's master and one of its slaves.

This structured design has advantages and disadvantages over the other formats described. It provides rigid control that is useful for time-critical applications and "plug and play" operation, and allows for devices to exist in multiple piconets. Lower power requirements decrease interference between overlapping piconets, allowing each piconet to enjoy most of its potential 1 Mbps throughput. But range is limited to less than typical household dimensions, bandwidth is inadequate for multimedia, the structure forces communication only with the master (slaves cannot communicate with each other during their time slots), the number of active devices in a piconet is severely limited, and the structure can waste bandwidth because the master must use an entire time slot each time it gives permission for transmission.

BRIEF DESCRIPTION OF THE DRAWINGS

The embodiments described below can be best understood with reference to the drawing, wherein.

DETAILED DESCRIPTION OF THE EMBODIMENTS

Figure 1:
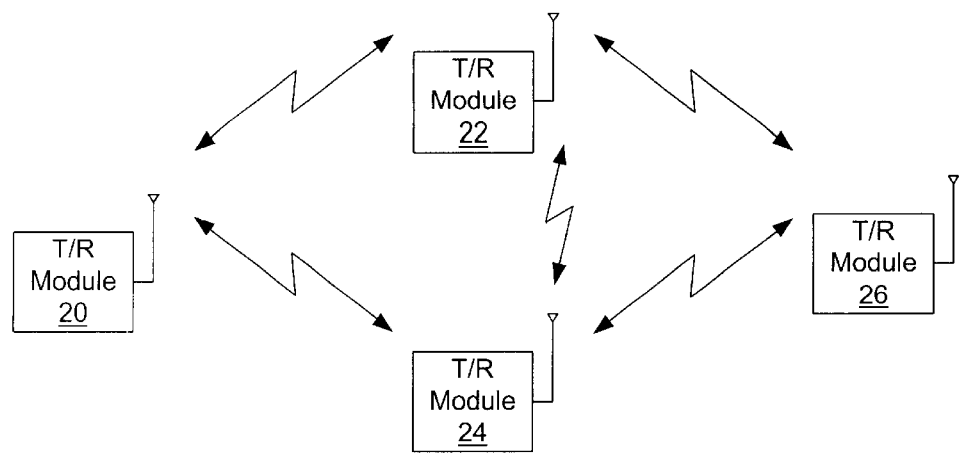
FIGS. 1 and 2 illustrate prior art wireless network concepts.
Figure 2:
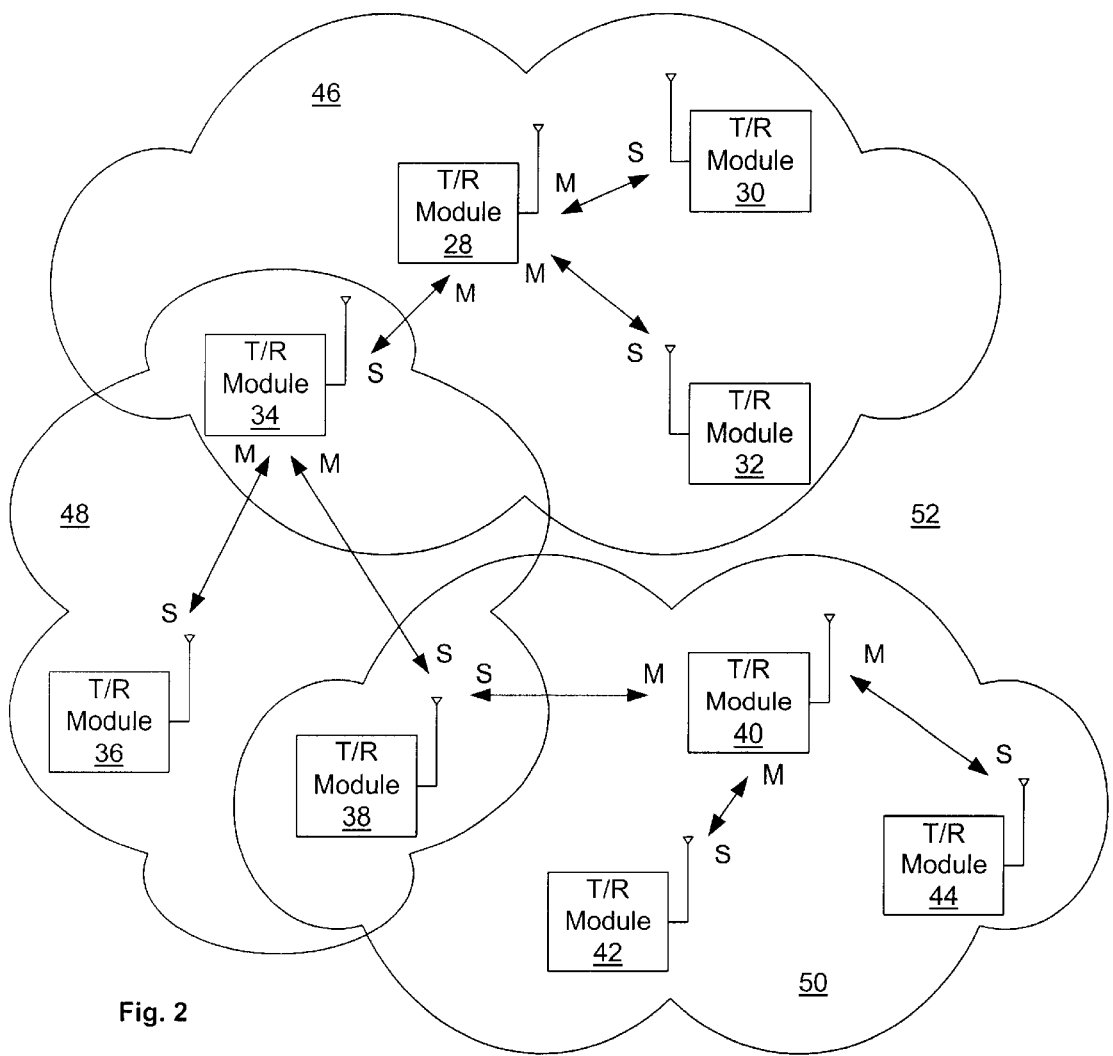

It has now been recognized that a distributed wireless local area network can be designed to overcome problems inherent in the prior art designs. This solution recognizes and combines several important principles—principles that may otherwise appear incompatible. First, in a localized wireless network, lower power and shorter range can be desirable attributes, as they decrease harmful interference with neighbors and unintended recipients, increase security and isolation, and allow for smaller, simpler transceiver designs. Second, robust, high-speed operation is best achieved with strong, direct-path signals, which maximize network flexibility and can best overcome interference.

According to various embodiments of the present invention, low-power transceivers can be used to create a robust network that can extend beyond each transceiver's useful range. This is accomplished using channel-shifting RF repeaters, thereby preferably providing more uniform radio coverage within a desired coverage area. A typical installation of a system according to an embodiment of the invention will include multiple transmitters and receivers (typically, the receive and transmit functions will be combined into a transceiver), and multiple channel-shifting repeaters. A base station controls the allocation of time on one or more available channels between competing transmitters, and may also control the function of the channel-shifting repeaters. When a given transmitter is transmitting, repeaters in range of that transmitter receive the signal, channel-shift the signal, and retransmit it. If the network is large enough, other repeaters may pick up the channel-shifted signal from the first repeaters, shift it to yet another channel, and retransmit it again. The destination receiver will receive one or more of the originally transmitted signal and its repetitions, depending on the receiver's relative location in the network. The repeaters can operate under very simple rules, or under simple control from the base station. Even when relatively "dumb" repeaters are employed, the network system can provide the following advantages: quick set up and reconfiguration—literally "plug and play"—when deployed in either new or existing construction; good, direct- or near-direct-path radio coverage throughout the network area, without high power transmitters that might increase expense, interfere with neighbors, and/or emit harmful radiation levels; the ability to make the network aesthetically "invisible"; high data rate channels; low cost; an ability to avoid localized RF interference; and almost limitless possibilities for the types of device that can be interconnected and/or controlled.

When implemented according to the following description, the preferred embodiments can provide an infrastructure backbone supporting a high-data-rate universal radio interface for almost any type of digital data, including the types identified in the background of the invention. The embodiments below describe a distributed wireless local area network system including repeaters, network components for such a system, and corresponding methods of operation. The system is suitable for household use, office use, and other environments with similarly limited network extent. Various other advantages of these embodiments will be detailed below.

Throughout the following description, several terms have defined meanings. A band is a range of available RF frequencies, although the range need not be contiguous in frequency. As used herein a channel is a communication channel or subchannel that uses RF transmission methods to convey digital information. A channel is not limited to any particular modulation scheme. Two channels can be arranged to be substantially non-interfering by arranging them in separate, substantially non-overlapping ranges of frequencies (e.g., two narrowband channels, or two FHSS channels using offset or different pseudorandom hopping sequences or phases), but those of ordinary skill will appreciate that substantial non-interference can be achieved in many other ways, such as by time-division multiplexing, code-division multiplexing (e.g., DSSS), or combinations of several or all of these techniques. A repeater can receive RF signals containing digital data not destined for the repeater itself, and retransmit that digital data as a second RF signal. In the embodiments described herein, repeating may involve simple replication of the analog RF signal on another channel, or may involve demodulating the digital data in the received signal and remodulating it.

Figure 3:
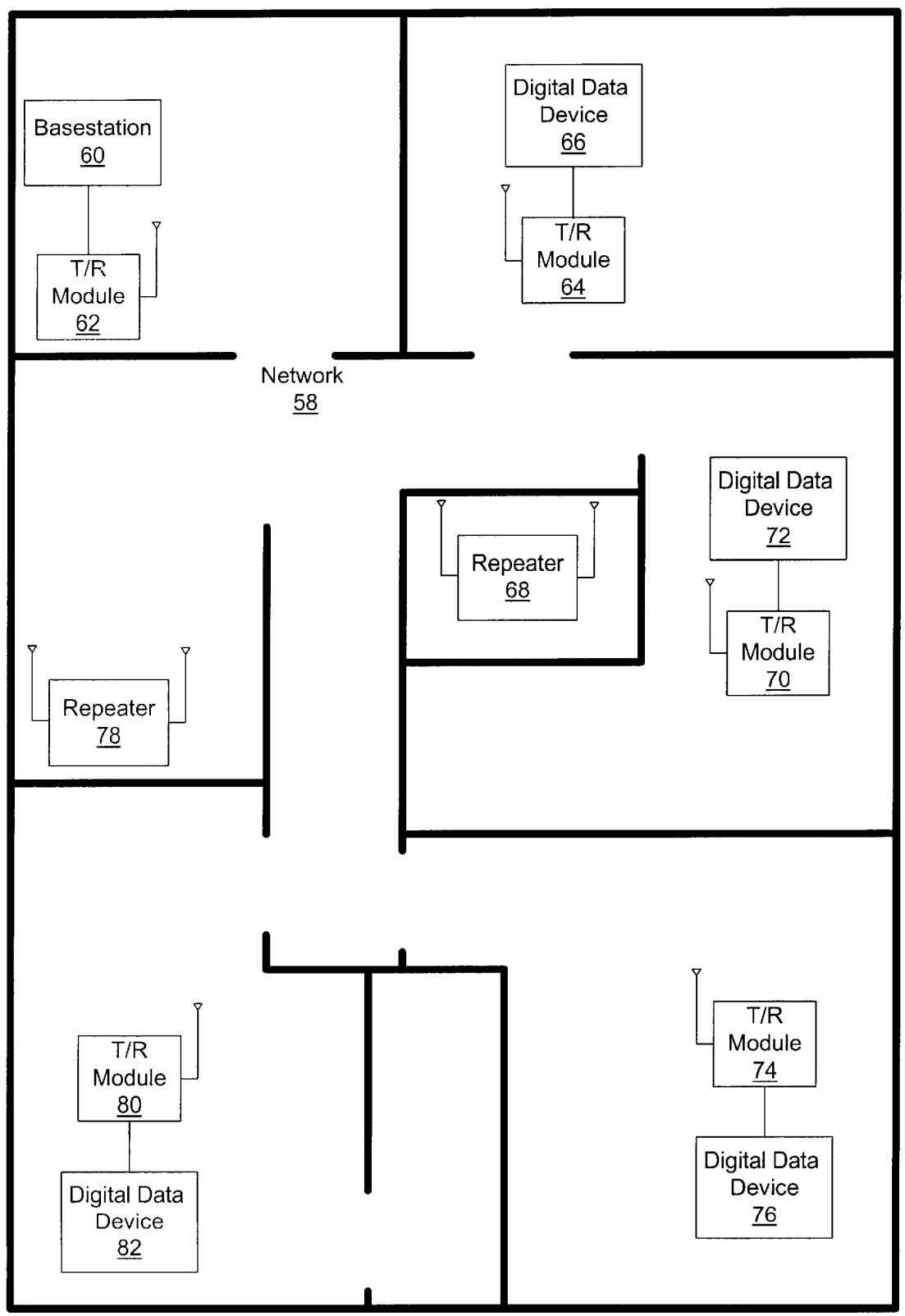
FIG. 3 shows an exemplary deployment of wireless network components in relation to a building floor plan according to one embodiment of the invention.

FIG. 3 illustrates a general embodiment of the invention, shown as a distributed wireless network superimposed on a building floor plan. A wireless local area network 58 (coextensive with the building in this case) comprises multiple transmit/receive (T/R) modules 62, 64, 70, 74, and 80, a base station 60, and repeaters 68 and 78. Each T/R module is connected to at least one digital data device 60, 66, 72, 76, 82 (each device being a source and/or sink of digital data). The connection between a T/R module and its attached digital data device(s) may be, e.g., by an appropriate wired connection, by an infrared connection, by a substantially non-interfering wireless connection, or by incorporating the T/R module as an integral part of the digital data device.

Depending on the method of operation chosen for network 58, connectivity between different combinations of T/R modules can change. FIGS. 4–7 illustrate different transmission scenarios for two sets of possible operational rules. The building partitions and digital data devices of FIG. 3 have been removed in FIGS. 4–7 for clarity. Where no signal line is shown between two network elements, where the first is transmitting, this indicates that the two elements are out of range for direct communication.

Figure 4:
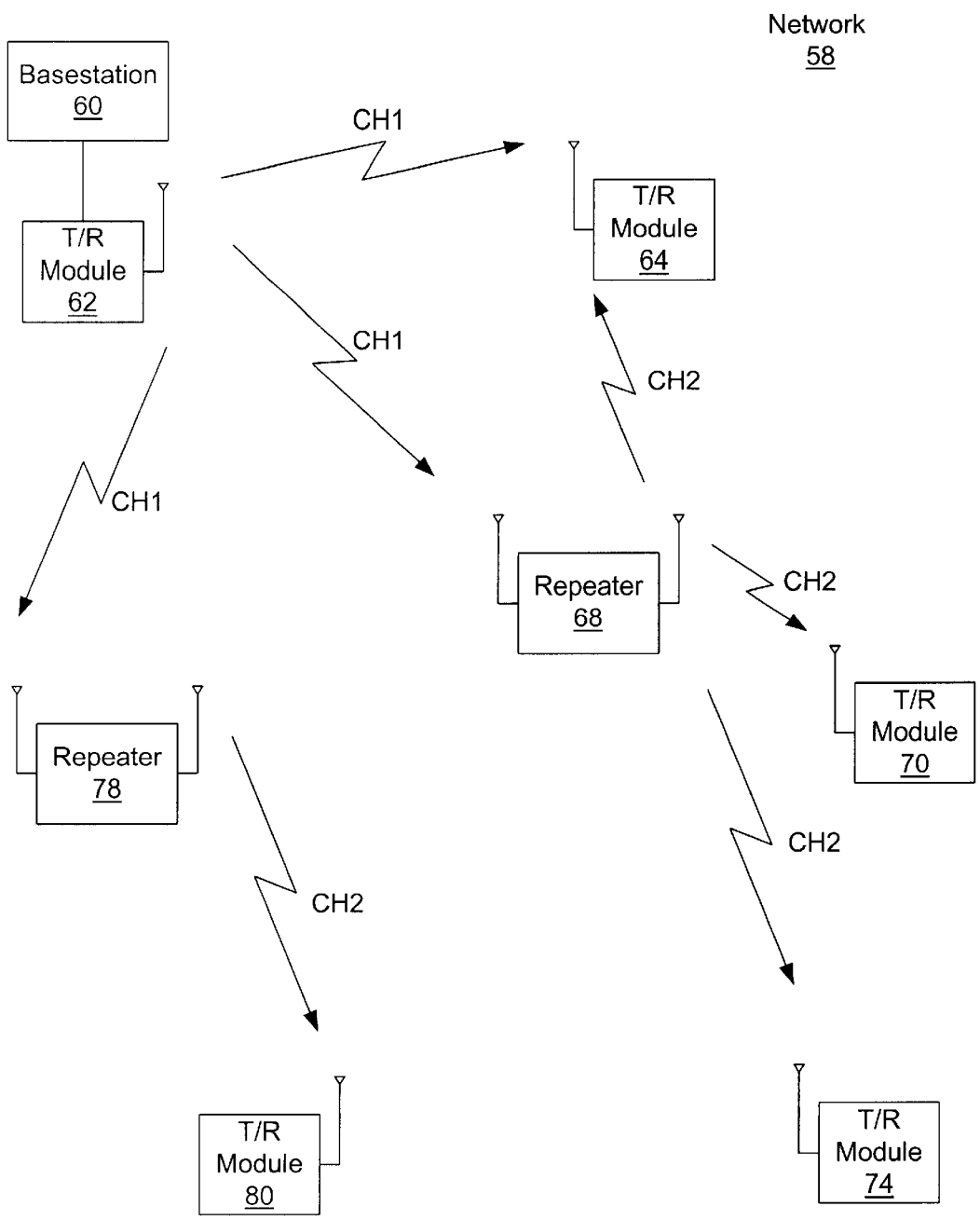
FIGS. 4, 5, 6, and 7 illustrate wireless network communications according to various embodiments of the invention.
Figure 5:
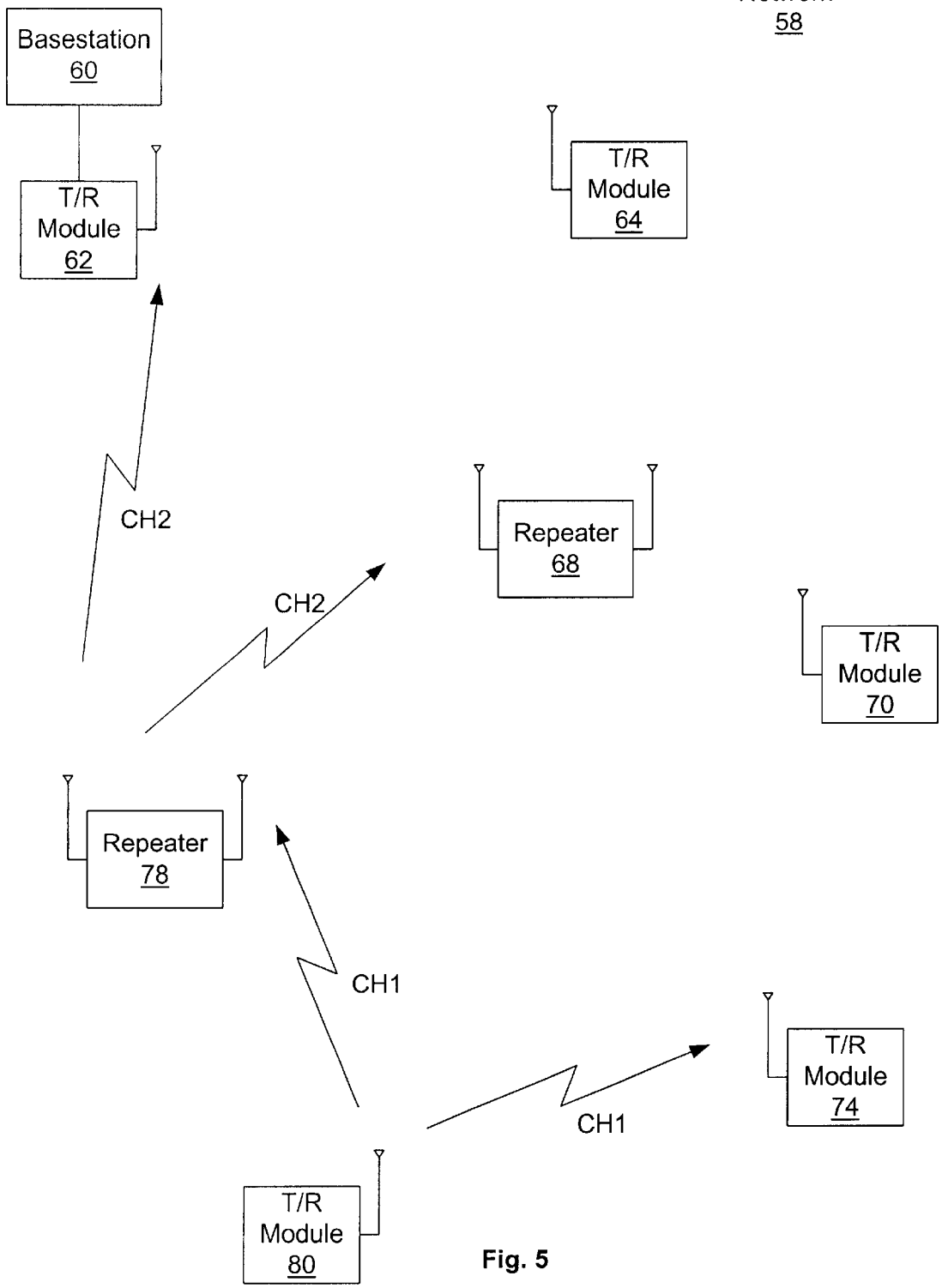

FIGS. 4 and 5 assume that two substantially non-interfering channels are available. Repeaters 68 and 78 have a single task to perform: they receive signals on a first channel (CH1) and retransmit these signals on a second channel (CH2). T/R modules 62, 64, 70, 74, and 80 transmit on CH1 and receive on CH2. In a system with added complexity, the T/R modules can selectively receive on either CH1 or CH2.

In FIG. 4, T/R module 62 transmits on CH1. Repeaters 68 and 78 retransmit T/R module 62's signal on CH2 to the other TR modules. Note that T/R module 64 is in range to receive both the original signal on CH1 and the repeated signal on CH2 from repeater 68. If so equipped, module 64 may select the signal it considers the strongest, or possibly even combine the signals at some point in demodulation. The other T/R modules receive on CH2.

FIG. 5 illustrates T/R module 80 transmitting on CH1. Repeater 78 and T/R module 74 pick up this signal, and repeater 78 retransmits it on CH2. Repeater 68 is in range to receive the retransmitted signal, but under these rules, performs no further retransmission. T/R module 62 is thus the only module that receives the retransmitted signal. Under these rules and this configuration, two-way communications can occur between T/R module 62 and any of the other T/R modules. But certain combinations of T/R modules, like those that cannot communicate in FIG. 5, cannot communicate. If this is unacceptable, other embodiments are available to handle this situation.

Figure 6:
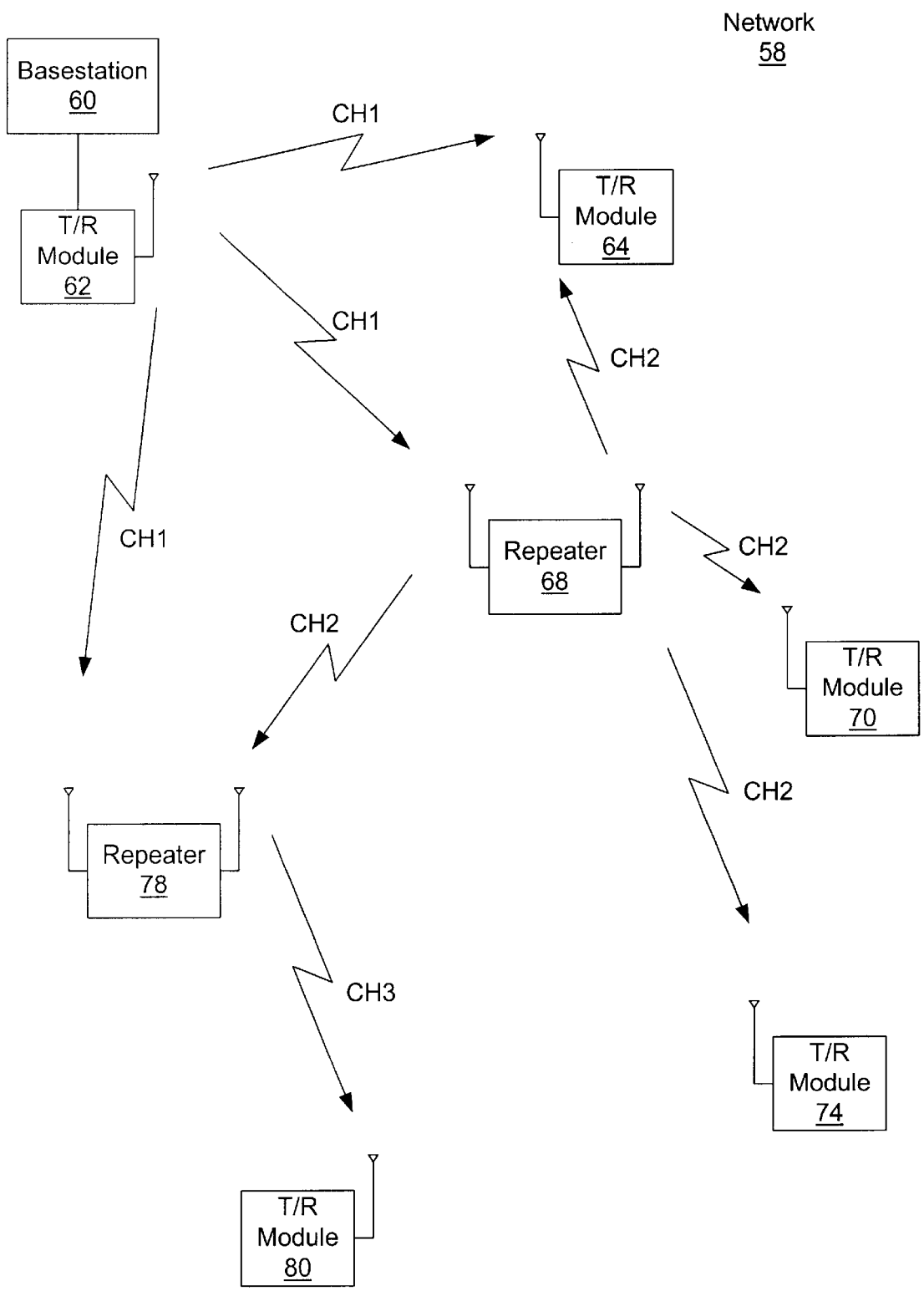
Figure 7:
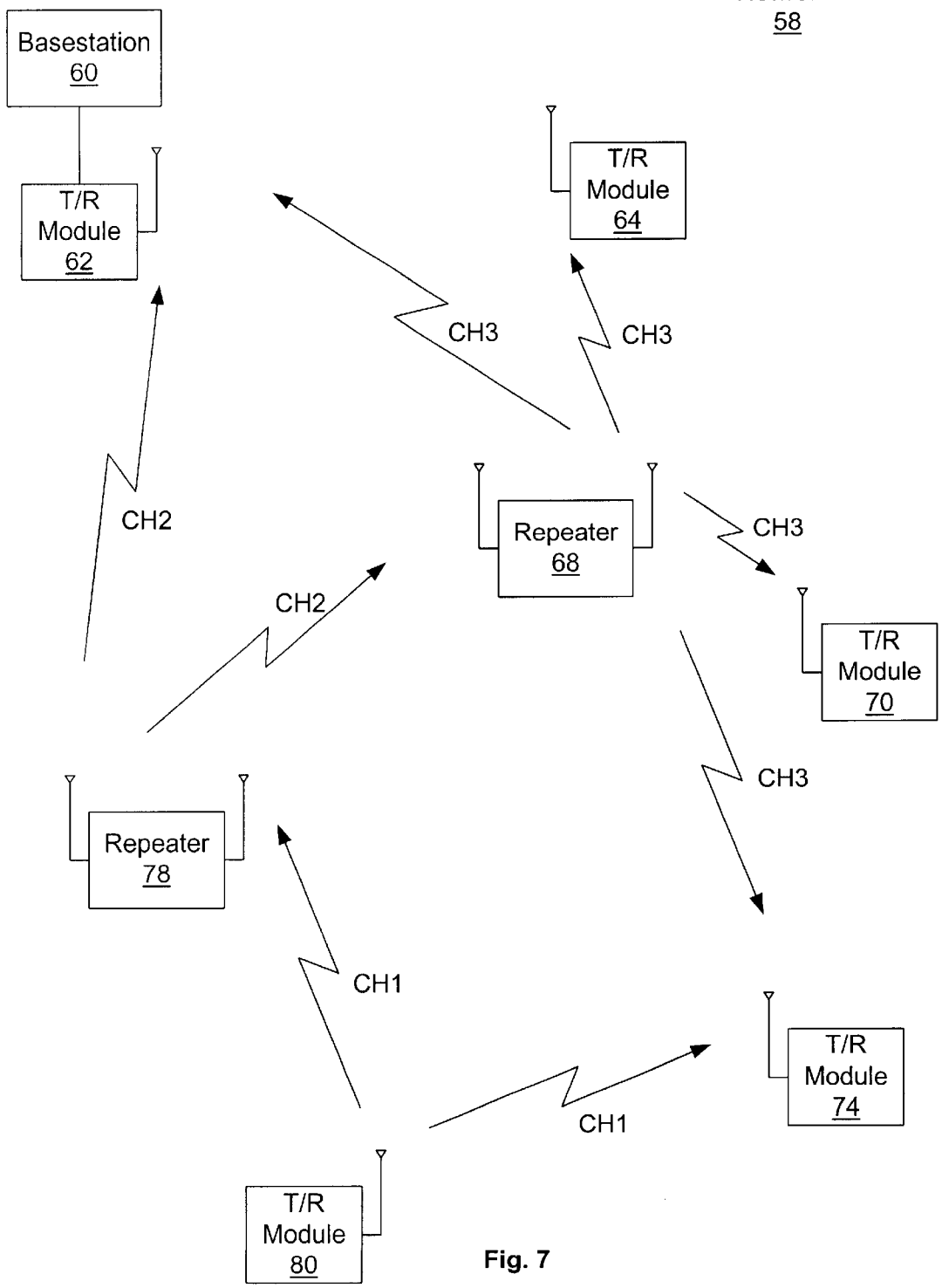

FIGS. 6 and 7 assume that three substantially non-interfering channels, CH1, CH2, and CH3, are available. Repeaters 68 and 78 can receive signals on both CH1 and CH2, and have the capability to retransmit a signal received on CH1 on CH2, and a signal received on CH2 on CH3. In some embodiments, the repeaters are set to one of these two repeating modes beforehand. In other embodiments, the repeaters can measure signal strength and decide for each signal, whether to repeat the CH1 signal on CH2, or to repeat a CH2 retransmission on CH3. Other possibilities include sensing the source and/or destination of the signal and performing an appropriate repetition. The receiving T/R modules can select either a CH2 signal or a CH3 signal for demodulation, and in some embodiments this selection is expanded to include a CH1 signal.

In FIG. 6, T/R module 62 transmits on CH1. Repeater 68 retransmits T/R module 62's signal on CH2 to the other TR modules in its range. In addition to reaching three T/R modules, the CH2 signal reaches repeater 78, and is a better signal than the more distant signal received from CH1. Repeater 78 thus repeats the CH2 signal on CH3.

FIG. 7 illustrates T/R module 80 transmitting on CH1. Repeater 78 and T/R module 74 pick up this signal, and repeater 78 retransmits it on CH2. Repeater 68 is in range to receive the retransmitted signal, and retransmits this signal on CH3. T/R module 62 is the only module that receives the retransmitted signal CH2. Under these rules and this configuration, two-way communications can occur between any of the T/R modules. Those of ordinary skill will appreciate that for a larger physical network, more channel-shifting repeaters and channels can be used to provide similar connectivity.

In some networks, it may be desirable to have a repeater "re-use" a channel, e.g., CH1, if that repeater does not overlap coverage areas with the original user of CH1 and its recipients. Because re-use may create feedback, this method of operation should be carefully deployed, preferably with "smart" repeaters that can communicate with the base station to test for feedback during configuration. Other similar rules to those disclosed are also possible, e.g., T/R modules may transmit on the same channel that they receive on. For instance, each repeater may be set up with one channel that will be used for communications with T/R modules served by that repeater, and another channel that will be used to link that repeater with the remainder of the network.

Figure 8:
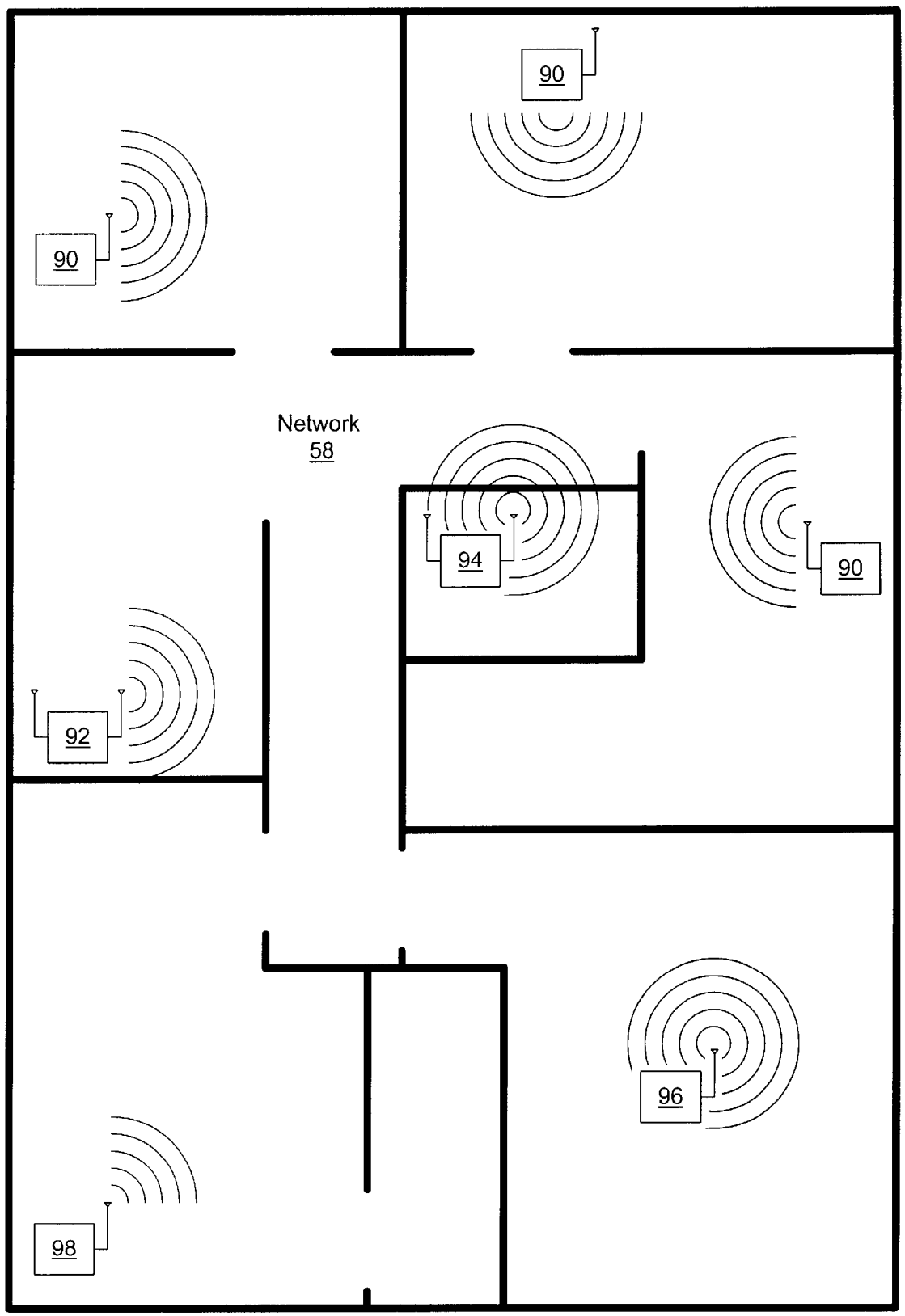
FIG. 8 depicts the use of differing antenna patterns within a wireless network to affect good radio coverage within the network and minimize RF emissions outside of the network.

FIG. 8 illustrates a further element of the invention that allows signal energy to be concentrated in the network and minimized outside of the network. Each T/R module and repeater can be fitted with an antenna having a beam pattern appropriate for its physical location in a building. Those units located near an exterior wall (e.g., T/R modules 90 and repeater 92) are fitted with a half-sector antenna. If the unit is near a corner of the desired coverage area (e.g., T/R module 98), a quadrant antenna can be fitted. For those units located in the interior of the building (e.g., T/R module 96 and repeater 94), an omni-directional or elliptical pattern antenna can be used. Preferably, the T/R modules and repeaters have a modular antenna attachment port, allowing a user to attach an antenna appropriate for the device's location.

Figure 9:
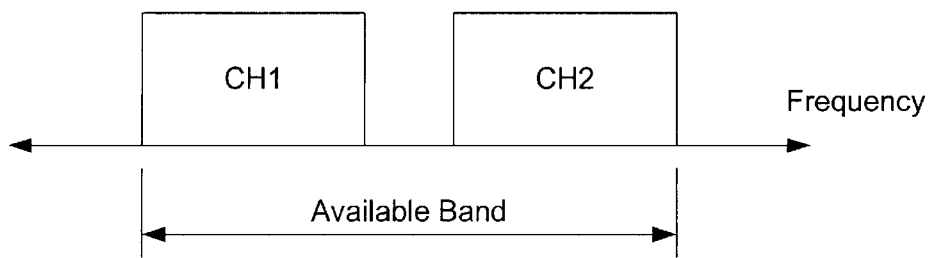
FIGS. 9, 10, 11, and 12 illustrate the use of frequency-division multiplexing to implement a wireless network according to embodiments of the invention.
Figure 10:
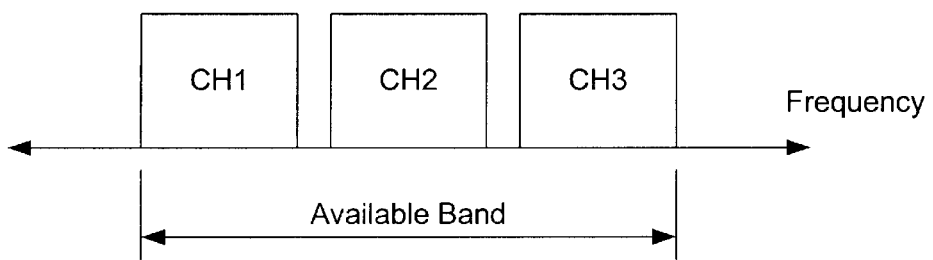

FIG. 9 illustrates a division of frequency space to provide two substantially non-interfering channels CH1 and CH2. The available band is divided into channels CH1 and CH2, separated by a guard band. At the ISM and U-NII frequencies, path loss can be 50 dB or more for a path of a few meters. The guard band allows a repeater (or T/R module) to transmit on one channel without saturating the receiver amplifier operating on the other channel, thus enabling simultaneous reception and transmission. FIG. 10 show a similar division of frequency space that provides three substantially non-interfering channels CH1, CH2, and CH3. Note that one possibility for providing more than two channels is to have two frequency bands, and code-multiplexing each of these bands to create the additional channels.

Figure 11:
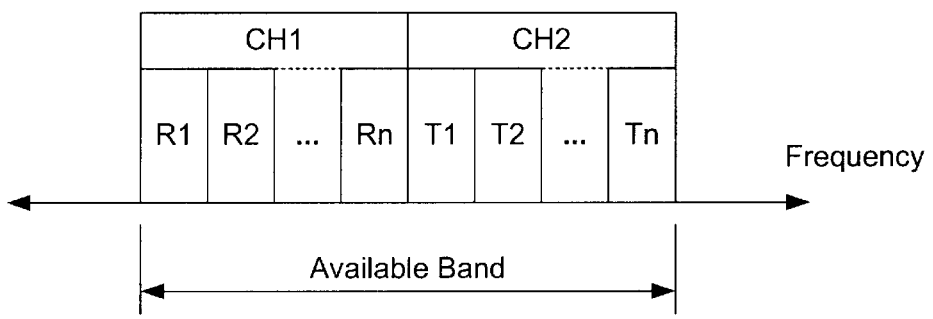

As more channels are added, it may be possible to decrease or eliminate the guard bands. This can be done because transmitting channels can be separated from receiving channels by channels that are not being used by that repeater or T/R module. For instance, FIG. 11 shows one frequency plan with two channels CH1 and CH2. Each channel is further divided into n subchannels. A particular repeater can receive on one of the n CH1 subchannels R1, R2, . . . , Rn, and retransmits on a corresponding CH2 subchannel T1, T2, . . . , Tn (other repeaters can be configured to receive on a CH2 subchannel and retransmit on a CH1 subchannel). The pairings selected for receive and transmit channels provides the separation necessary to provide substantial non-interference. A total of (2n−1) repeaters could be used in such a network without subchannel re-use.

Figure 12:
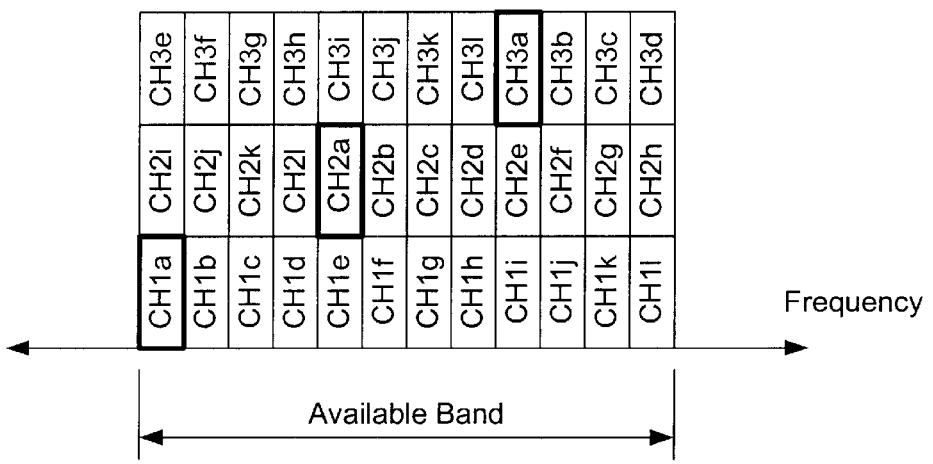

FIG. 12 extends the idea shown in FIG. 11 for a system that employs FHSS. A total of twelve hopping frequencies are allocated in the available band of FIG. 12. If, for example, three channels are used by the T/R modules and repeaters, these channels can be based on a single hopping sequence, i.e., channels CH1, CH2, and CH3 can hop in a manner that maintains three hopping frequencies of separation between any two active channels. As depicted by the bold outlines in FIG. 11, CH1a, CH2a, and CH3a signify three channels that can be simultaneously active. The other groups of channels with common suffixes can likewise be simultaneously active and maintain good separation and apparent frequency hop randomness in the network.

Figure 13:
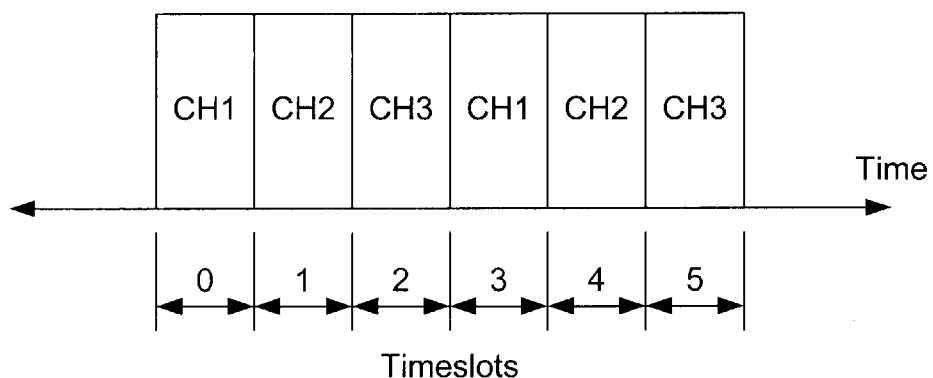
FIG. 13 illustrates the use of time-division multiplexing to implement a wireless network according to an embodiment of the invention.

FIG. 13 shows a plan that provides substantially non-interfering channels via time-division multiplexing. CH1 is active in timeslot 0. Repeaters receiving this signal repeat it on CH2 during timeslot 1. Repeaters receiving the second signal repeat it during timeslot 2. At timeslot 3, a T/R module can transmit a new packet of data on CH1, and the process repeats.

The concept of code-division multiplexing is equally applicable to the invention, although difficult to illustrate. Generally, the code chipping sequences for the separate channels can be related such that orthogonality is guaranteed for each symbol, when the received signal is compared with its retransmitted version. This concept will be explained in further detail later, during description of a code-division multiplexing repeater embodiment.

Figure 14:
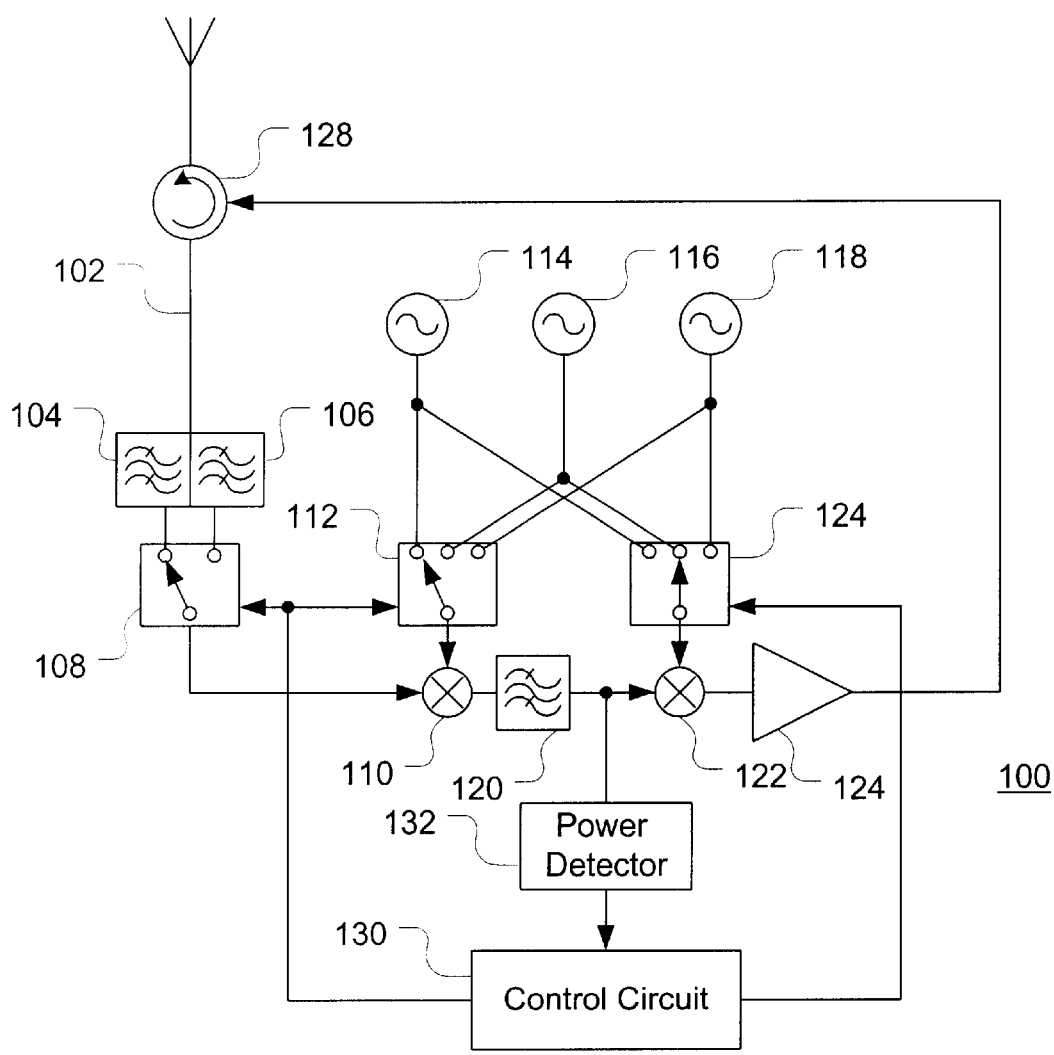
FIGS. 14, 15, 16, and 17 contain block diagrams for channel-shifting repeaters according to several embodiments of the invention.

FIG. 14 shows a block diagram for a repeater 100 according to one embodiment of the invention. Receiving antenna 102 is coupled through a circulator 128 to two bandpass filters 104 and 106. Bandpass filter 104 is designed to pass CH1 and reject CH2. Bandpass filter 106 is designed to pass CH2 and reject CH3. RF switch 108 selects the filtered signal from one of filters 104 and 106 as an input to mixer 110. The second input to mixer 110 is provided from the output of a second RF switch 112, which can select the output from one of three oscillators 114, 116, and 118. Oscillator 114 oscillates at the center frequency of CH1 minus an intermediate frequency (IF). Oscillators 116 and 118 oscillate respectively at the differences between CH2 and IF, and CH3 and IF.

The output of mixer 110 is coupled to a filter 120 that passes a channel width centered at IF, and rejects higher frequencies. Filter 120's output is coupled to a second mixer 122, which has its second input coupled to the output of a third RF switch 124. RF switch 124 has the same inputs as RF switch 108 (note that in some embodiments, RF switch 108 need only switch the output of 114 and 116, and RF switch 124 need only switch the output 116 and 118). This upconverts the IF signal to the retransmission frequency, which is amplified by amplifier 126 and transmitted on transmit antenna 128.

Control circuit 130 controls RF switches 108, 112, and 124. In this embodiment, a power detector 132, which may be as simple as a diode detector, provides an indication of received power to control circuit 130. Control circuit 130 operates switches 108 and 112 to test the relative strength of signals received on CH1 and CH2, and then selects a switch configuration for a repeating mode that corresponds with the strongest received signal. For instance, if CH1 is the strongest, switch 108 selects the output of filter 104, switch 112 selects the output of oscillator 114, and switch 124 selects the output of oscillator 116. And if CH2 is the strongest, switch 108 selects the output of filter 106, switch 112 selects the output of oscillator 116, and switch 124 selects the output of oscillator 118.

Control circuit 130 can be implemented to perform its function in several ways. One way is to have the control circuit perform an infrequent configuration test, e.g., at power-on or at random or preset intervals. The results of this test would be used to set the repeating function to repeat the strongest signal. Another way is to have the control circuit scan CH1 and CH2 for a signal having enough power to warrant repeating, and then repeat that signal. These are merely examples, as other selection methods and criteria exist, several of which will be discussed in conjunction with the description of later embodiments.

Figure 15:
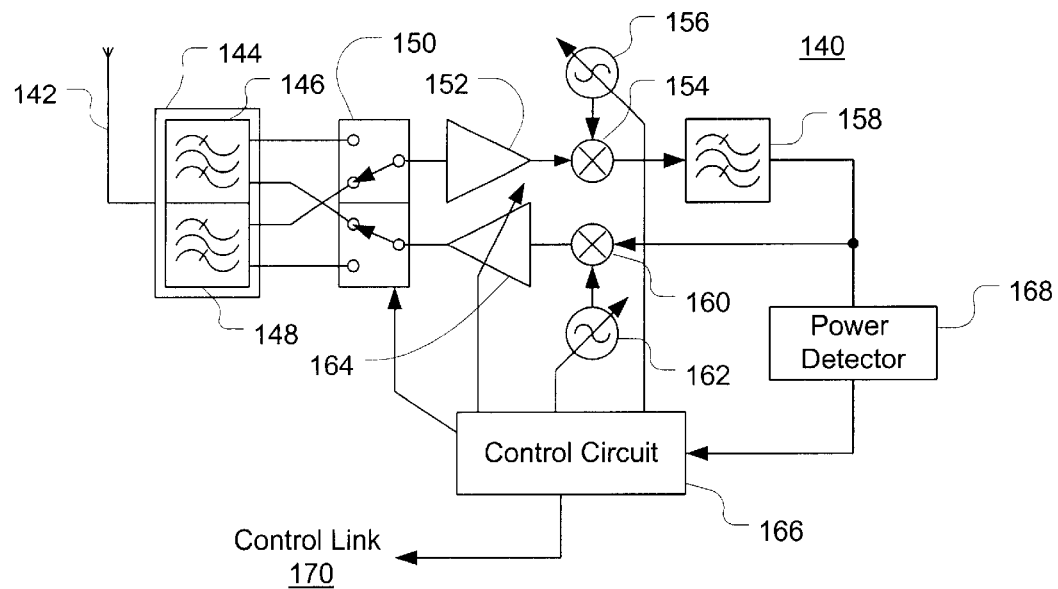

FIG. 15 depicts a second repeater embodiment 140 that can function in the same manner as repeater 100, although repeater 140 illustrates additional aspects of the invention. Repeater 140 incorporates an antenna 142 coupled to a duplexer 144 that allows simultaneous transmit and receive. Duplexer 144 contains bandpass filters 146 and 148, similar to filters 104 and 106 of FIG. 13. A dual switch 150 connects one of the filters to the input side of the circuit (the input of amplifier 152), and the other of the filters to the output side of the circuit (the output of amplifier 164).

Many of the remaining functions are repeated from FIG. 14. But instead of three switched oscillators, IF downconversion and upconversion is provided by two frequency synthesizers 156 and 162. Each is controlled by control circuit 166, allowing a wider range of frequencies to be channel-shifted. This adds flexibility to reconfigure the system for a different number of network channels (see FIG. 11), as well as to operate with frequency-hopped spread spectrum channels (see FIG. 12). When employed with FHSS, control circuit 166 can follow the hopping sequence and control frequency synthesizers 156 and 162 appropriately.

Another difference in repeater 140 is that control circuit 166 maintains a control link 170 with the network base station. This allows the base station to configure the repeating network, e.g., define the receive and transmit channels for each repeater. Output amplifier 164 also has controllable output power, which control circuit 166 can adjust in response to commands from the base station. If the T/R modules served by a repeater do not require full repeater power to receive accurate signals, control circuit 166 can reduce transmit power, thereby reducing the potential for interference, and possibly allowing channel re-use elsewhere in the network.

Control link 170 can have many functions besides just setting receive and transmit channels. It can be used by the base station to schedule when a repeater should scan receive channels for interference sources. A configuration test can also be initiated by the base station, where different T/R modules and repeaters are operated in sequence on different channels. Control circuit 166 reports to the base station the channel power received at each test point in the sequence, and any interference sources, allowing the base station to develop a repeating plan for the network that provides effective coverage. Control link 170 can also be used to provide synchronization and timing cues for the high-bit-rate channel, allowing devices coming in to the network to synch quickly.

Control link 170 has a relatively low bit-rate requirement, but needs to be robust, and preferably should be able to reach the entire network without repetition. Therefore, although the high-bit-rate main channel could be used to provide control link 170, control link 170 is preferably implemented with a separate, low-bit-rate channel. Control link 170 could be implemented with a high process gain DSSS channel occupying the same frequency band as the high bit rate channels, allowing this channel to be received by the entire network without repetition. Alternately, a lower-frequency channel, e.g., a 900 MHz channel or a channel in a licensed band, could be selected. A third alternative is to use AC power wiring, phone wiring, or any other available wiring to provide the control link between the base station and the repeaters.

Figure 16:
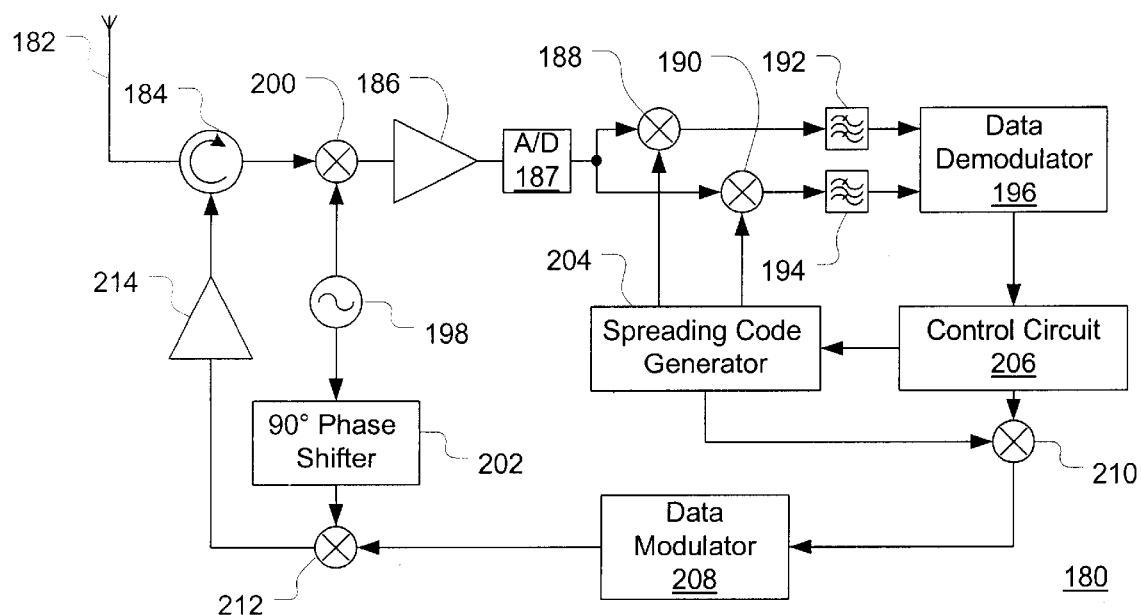

FIG. 16 shows a third repeater embodiment 180, suitable for use with a code-division-multiplexed channel-shifting repeater network. Antenna 182, circulator 184, input amplifier 186, and output amplifier 214 function similarly to previous embodiments. But because DSSS makes signal power detection on any particular channel without de-spreading difficult, repetition of such a signal generally requires data demodulation and remodulation. Furthermore, if a separate code sequence is to be used on the repetition channel, de-spreading is necessary (alternately, the same code sequence could be employed by delaying the retransmitted signal sufficiently to de-correlate it with the incoming signal).

Oscillator 198 synchronizes to the detected carrier. The output of oscillator 198 is mixed at mixer 200 with the input signal, prior to input amplifier 186. FIG. 16 shows the output of input amplifier 186 processed by an A/D converter, split, and applied to two multipliers 188 and 190, which attempt to apply two despreading sequences to the data. This allows the repeater to simultaneously check for the existence of a CH1 signal and a CH2 signal. Spreading code generator 204 supplies the first code, which corresponds to the CH1 signal chip, and the second code, which corresponds to the CH2 signal chip. These codes are applied, respectively, to multipliers 188 and 190.

The de-spread signals output by multipliers 188 and 190 are passed through filters 192 and 194, and then demodulation is attempted by data demodulator 196. Generally, demodulation will be successful on either CH1 or CH2, but not both. Thus an alternative is to have spreading code generator only output one spreading code, with control circuit 206 instructing generator 204 whether to output the CH1 code or the CH2 code. This generally requires that a constant channel be selected for use in normal operation. It does, however, avoid having two input processing streams.

Control circuit 206 receives data from demodulator 196, and passes it to multiplier 210 for multiplication with the appropriate output spreading code, and then on to data modulator 208 for remodulation. Control circuit 206 may include additional sophistication, such as the ability to examine the data's source and/or destination and select a corresponding output channel. Control circuit 206 may also attempt error detection and/or correction on the data before sending it to the data modulator.

Finally, the modulated and spread IF signal is mixed at mixer 212 with a phase-shifted version of the signal output by oscillator 198. If the circulator 184 and phase shifter 202 cannot sufficiently isolate the input and output signals, the two-frequency or time-multiplexed embodiments described above can be combined, where each repeater and T/R module transmits and receives in a non-interfering fashion to avoid input amplifier saturation. For example, odd-numbered DSSS channels could use a first frequency band, and even-numbered DSSS channels could use a second, non-overlapping frequency band.

Figure 17:
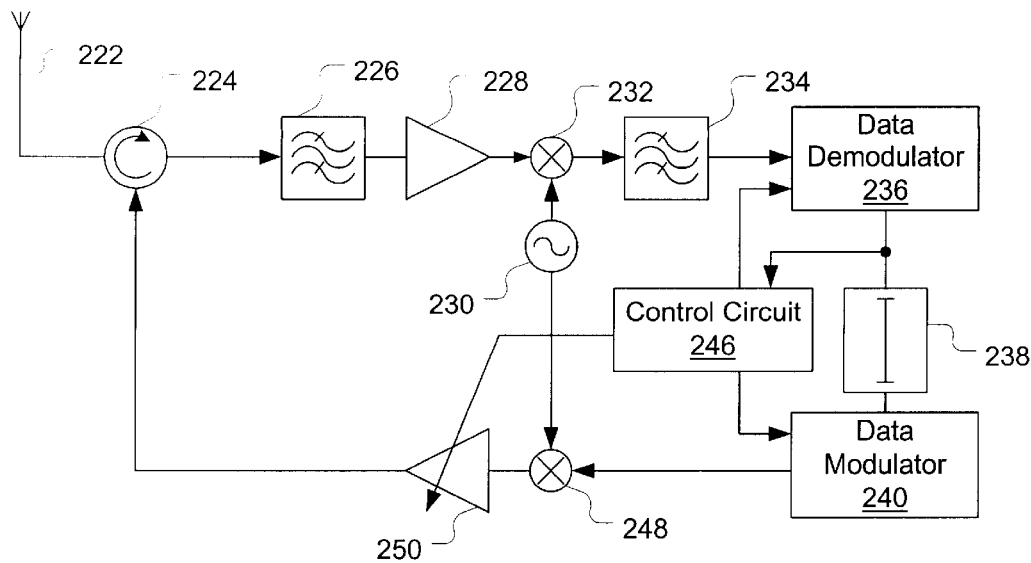

FIG. 17 illustrates an embodiment suitable for use with time-division-multiplexing. The critical added feature is a delay element 238, e.g., a buffer to store data received in one time slot for retransmission during the following time slot. Various features described above can also be incorporated into this embodiment, such as transmit-while-receive using two frequencies, FHSS, or DSSS.

It is to be understood that the base station controls which T/R module(s) are allowed to transmit during a given time interval. The exact method for apportioning bandwidth between T/R modules will generally depend on application and higher-layer protocols, and is beyond the scope of this invention, which provides the low-layer framework for the distributed network.

The T/R modules have not been described in block diagram form, because their construction can be almost identical to that of the repeaters described above. The main difference is that T/R modules do not "repeat" data per se—they receive some data and transmit different data, according to a transmission path set up between the T/R module and a remote T/R module. Another difference is that T/R modules necessarily include a demodulator to receive signals and demodulate them in order to receive digital data.

Figure 18:
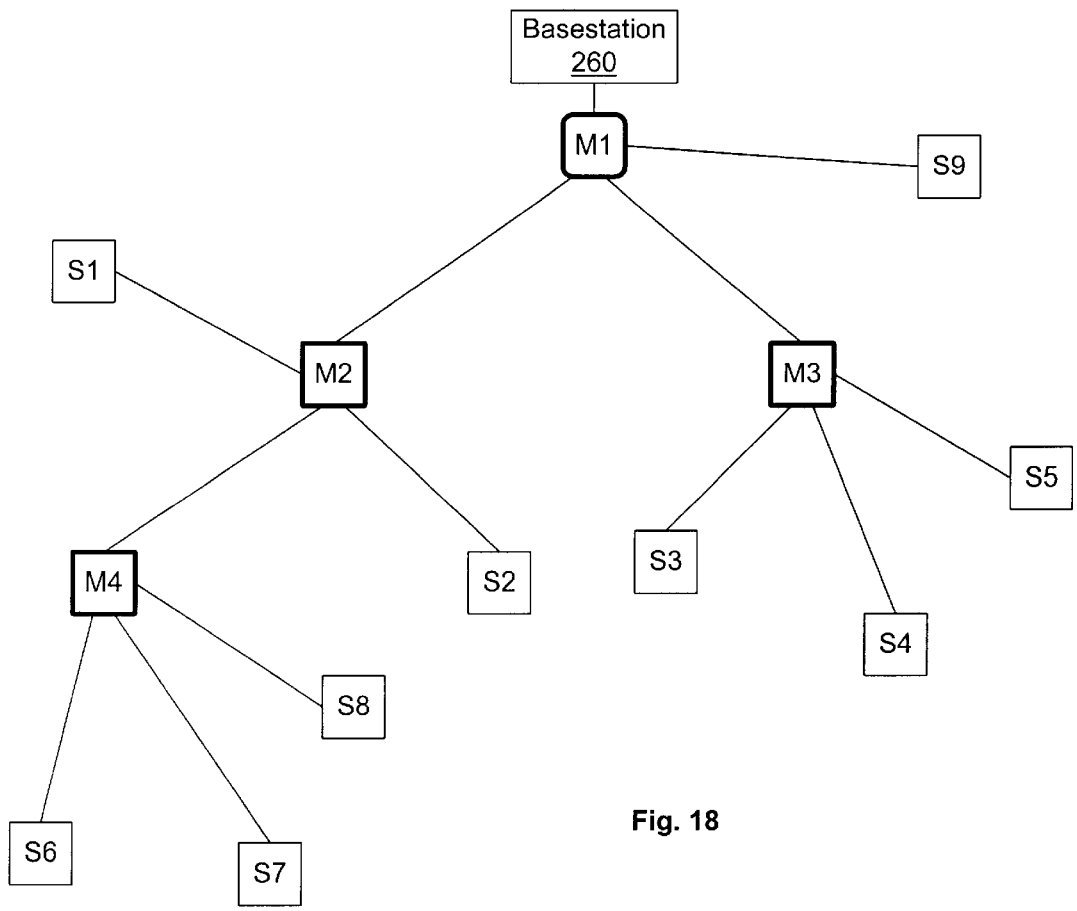
FIG. 18 illustrates a wireless network, according to an embodiment of the invention, that operates within the framework specified for Bluetooth™-compliant components.

Although not preferred, an embodiment of the invention could be implemented, e.g., in a Bluetooth™ environment. Generally, according to one embodiment, this would require that the base station 260 be connected to a master T/R module M1, as shown in FIG. 18. M1 would be master of a first piconet of up to seven slaves, including first-level repeaters M2 and M3, and possibly T/R modules like S9. First-level repeaters M2 and M3 are in turn masters of their own piconets, which can include slave T/R modules, like S1, S2, S3, S4, and S5, and any second-level repeaters like M4. Second-level repeater M4 is in turn master of its own piconet of slaves. This construct could be repeated to additional levels if necessary. To the individual T/R modules, the presence of M1 would in essence be "projected" down to their individual master repeaters, which would have the capability to forward packets received from above to the appropriate slave. But because Bluetooth™ piconets cannot be synchronous and slaves must be granted permission by their master before transmitting, each repeater would need the capability to hold packets until the packets could be handled by the upstream master.

One additional difficulty with deploying this embodiment in a Bluetooth™ environment is that individual packet addressing is limited to one of seven active slaves per piconet. Thus, without more, each repeater could only link one active slave T/R module at a time to the level above. If more than seven total slaves exist, or more than one slave in a repeating branch desires to be active, at least some sort of virtual parking must be implemented by the repeaters. The coordination of parking and activation may deplete bandwidth resources quickly if more than seven slaves wish to appear "active" to M1. Therefore, a wider implementation may require that M1 and the repeaters provide some scheme, apart from or tunneled within the Bluetooth™ data packets themselves, for routing packets to the appropriate destination. At this level, the repeaters begin to have the sophistication of a router, rather than a simple repeater.

Those of ordinary skill will understand that various aspects of the embodiments described above can be combined in a large number of permutations. Furthermore, many alternate implementations, functionally equivalent to those described herein, will become apparent to those of ordinary skill upon reading this disclosure. Such permutations and alternate implementations are intended to fall within the scope of the invention as claimed below.

What is claimed is:

1. A wireless local area network system comprising:
   one or more radio frequency transmitters to transmit digital data in a first channel;
   a first radio frequency repeater to receive signals containing digital data in the first channel from one or more of the transmitters and retransmit such signals in a second channel, the second channel substantially non-interfering with the first channel;
   one or more radio frequency receivers to receive digital data in the second channel, wherein at least one of the receivers has the capability to receive signals in both the first and the second channels and the capability to select a signal from either the first or the second channel as the received signal from which to retrieve digital data; and
   a base station to allocate use of the first channel between two or more transmission paths, wherein each transmission path originates at one of the transmitters.

2. A wireless local area network system comprising
   one or more radio frequency transmitters to transmit digital data in a first channel;
   a first radio frequency repeater to receive signals containing digital data in the first channel from one or more of the transmitters and retransmit such signals in a second channel, the second channel substantially non-interfering with the first channel;
   a second radio frequency repeater having the capability to receive signals in both the first and the second channels, the capability to retransmit a signal received in the first channel using the second channel, and the capability to retransmit a signal received in the second channel using a third channel, the third channel substantially non-interfering with the first and second channels; and
   a base station to allocate use of the first channel between two or more transmission paths, wherein each transmission path originates at one of the transmitters.

3. The system of claim 2, wherein the second repeater has the capability to selectively retransmit either a signal received in the first channel from one of the transmitters or a corresponding retransmission of that signal, received in the second channel from the first repeater.

4. The system of claim 3, wherein at least one of the receivers has the capability to receive signals in both the second and the third channels and the capability to select a signal from either the second or the third channel as the received signal from which to retrieve digital data.

5. The system of claim 3, wherein at least one of the receivers has the capability to receive signals in each of the first, second, and third channels and the capability to select a signal from either the first, second, or third channels as the received signal from which to retrieve digital data.

6. The system of claim 3, wherein at least one of the receivers has the capability to receive signals in each of the first, second, and third channels and the capability to combine signals from at least two of these channels in order to retrieve the digital data.

7. The system of claim 3, wherein the first, second, and third channels represent a division of an available radio band into first, second, and third segments, selected from the group of divisions consisting of: non-overlapping frequency allocation, frequency hopping using frequency-offset pseudorandom hopping sequences, frequency hopping using different pseudorandom hopping sequences, frequency hopping using different phases of the same pseudorandom hopping sequence, time-division multiplexing, code-division multiplexing, and combinations thereof.

8. The system of claim 1, wherein the first and second channels represent a division of an available radio band into first and second segments, selected from the group of divisions consisting of: non-overlapping frequency allocation, frequency hopping using frequency-offset pseudorandom hopping sequences, frequency hopping using different pseudorandom hopping sequences, frequency hopping using different phases of the same pseudorandom hopping sequence, time-division multiplexing, code-division multiplexing, and combinations thereof.

9. The system of claim 1, wherein each of the first and second channels is divided into an uplink subchannel and a downlink subchannel, to allow one of the transmitters to transmit in an uplink subchannel while another of the transmitters transmits in a downlink subchannel.

10. The system of claim 1, wherein at least one of the transmitters comprises a modular antenna attachment port, allowing that transmitter to be configured to transmit in different patterns by interchanging one modular antenna for another having a different pattern.

11. The system of claim 1, wherein the first repeater comprises a modular antenna attachment port, allowing that repeater to be configured to transmit in different patterns by interchanging one modular antenna for another having a different pattern.

12. A radio frequency repeater comprising:
    a receiver to receive signals in a first channel selected from n receive channels, n>1, the n receive channels occupying a first radio frequency band;
    a transmitter to retransmit, in a second channel, a signal containing digital data and received in the first channel, the second channel substantially non-interfering with the first channel;
    a control circuit to select the first and second channels, wherein the control circuit selects the second channel from n transmit channels, the n transmit channels occupying a second radio frequency band;
    an antenna; and
    a duplexer, the duplexer connected to the antenna, receiver, and transmitter to allow simultaneous operation of the receiver in the first radio frequency band and the transmitter in the second radio frequency band.

13. The repeater of claim 12, further comprising a switch inserted between the duplexer and the receiver and between the duplexer and the transmitter, the switch operated by the control circuit to allow an additional operational mode wherein the n receive channels occupy the second radio frequency band and the n transmit channels occupy the first radio frequency band.

14. A radio frequency repeater comprising:
    a receiver to receive signals in both a first channel and a second channel;

a transmitter having a first operational mode that retransmits a signal containing digital data and received in the first channel in the second channel and a second operational mode that retransmits a signal containing digital data received in the second channel in a third channel; and a control circuit to configure the transmitter in one of the operational modes.

15. The repeater of claim 14, wherein the control circuit has the capability to configure the transmitter based on an examination of a received signal.

16. The repeater of claim 14, wherein the control circuit has the capability to determine the source, destination, or both for a received signal, and use the results of this determination to configure the transmitter.

17. The repeater of claim 14, wherein the control circuit has the capability to compare received signal strength in the first and second channels, and use the results of this comparison to configure the transmitter.

18. The repeater of claim 14, wherein the control circuit has the capability to configure the transmitter based on a remote command.

19. The repeater of claim 18, further comprising a link channel transceiver to receive the remote commands.

20. The repeater of claim 14, the transmitter having a third operational mode that retransmits a signal containing digital data and received in the first channel in the third channel.

21. The repeater of claim 14, the transmitter having a third operational mode that retransmits a signal received in the third channel in the first channel.

22. The repeater of claim 14, wherein in each of the operational modes, the receiver downconverts a received signal to an intermediate frequency signal, and the transmitter upconverts the intermediate frequency signal to form a retransmit signal without demodulating the digital data contained in the received signal.

23. The repeater of claim 14, further comprising first, second, and third local oscillators, the receiver coupled to the first and second local oscillators to frequency shift signals received respectively in the first and second channels.

24. The repeater of claim 23, the transmitter coupled to the second and third local oscillators to frequency shift signals to be retransmitted respectively in the second and third channels.

25. The repeater of claim 24, the receiver comprising first and second switches controlled by the control circuit, the first switch coupled between at least the first and second oscillators and the receiver, the second switch coupled between at least the second and third oscillators and the transmitter.

26. The repeater of claim 14, wherein the first, second, and third channels comprise first, second, and third time slots in a time-division multiplexed radio frequency channel.

27. The repeater of claim 14, further comprising:

a demodulator having the capability to demodulate digital data from a signal received in the first or the second channel; and a modulator having the capability to create a signal using the demodulated digital data, the modulator coupled to the transmitter.

28. The repeater of claim 14, further comprising a modular antenna attachment port, allowing the repeater to be configured to receive and transmit in different patterns by interchanging one modular antenna for another having a different pattern.

29. A radio frequency receiver comprising:

a demodulator having the capability to receive a first signal in a first channel and demodulate that signal, and having the capability to receive a second signal in a second channel, the second signal representing a repeated version of the first signal, and demodulate that second signal; and a selector circuit to selectively configure the receiver to output digital data demodulated from the first signal or the second signal, the selector circuit having the capability to selectively configure the receiver to output digital data from the channel having the largest signal strength.

30. A radio frequency receiver comprising:

a demodulator having the capability to receive a first signal in a first channel and demodulate that signal, and having the capability to receive a second signal in a second channel, the second signal representing a repeated version of the first signal, and demodulate that second signal; and a selector circuit to selectively configure the receiver to output digital data demodulated from the first signal or the second signal;

wherein the demodulator has the further capability to receive a third signal in a third channel, the third signal representing a repeated version of the first or second signal, and demodulate that third signal, and wherein the selector circuit has the further capability to selectively configure the receiver to output digital data demodulated from the third signal.

31. A radio frequency receiver comprising:

a demodulator having the capability to receive a first signal in a first channel and demodulate that signal, and having the capability to receive a second signal in a second channel, the second signal representing a repeated version of the first signal, and demodulate that second signal; and a selector circuit to selectively configure the receiver to output digital data demodulated from the first signal or the second signal;

wherein the first and second channels represent a division of an available radio band into first and second segments, selected from the group of divisions consisting of: non-overlapping frequency allocation, frequency hopping using frequency-offset pseudorandom hopping sequences, frequency hopping using different pseudorandom hopping sequences, frequency hopping using different phases of the same pseudorandom hopping sequence, time-division multiplexing of a channel, code-division multiplexing of a channel, and combinations thereof.

32. The receiver of claim 29, further comprising a transmitter.

33. The receiver of claim 32, wherein the transmitter has the capability to transmit digital data using at least one of the channels that can be received by the demodulator.

34. A radio frequency receiver comprising:

a demodulator having the capability to receive a first signal in a first channel and demodulate that signal, and having the capability to receive a second signal in a second channel, the second signal representing a repeated version of the first signal, and demodulate that second signal;

a selector circuit to selectively configure the receiver to output digital data demodulated from the first signal or the second signal; and a modular antenna attachment port, allowing that receiver to be configured to receive and transmit in different patterns by interchanging one modular antenna for another having a different pattern.

35. A method of providing a wireless local area network in a defined service area, the method comprising:

distributing one or more radio frequency transmitters within the service area, each transmitter connected to at least one corresponding source of digital data and configured to transmit digital data from that source in at least one transmit channel;

distributing one or more radio frequency repeaters within the service area, at least one repeater configured to receive a signal in at least one transmit channel and repeat that signal in at least one repetition channel;

distributing one or more radio frequency receivers within the service area, at least one receiver connected to at least one sink for digital data and configured to receive digital data from at least one repetition channel;

transmitting digital data from one source of digital data, connected to one of the transmitters, to one sink for digital data, connected to one of the receivers, via at least one of the radio frequency repeaters; and providing a base station and a low-bit-rate channel connecting the base station and the repeaters, and using the low-bit-rate channel to determine receive and repetition channels for each of the repeaters.

36. A method of providing a wireless local area network in a defined service area, the method comprising:

distributing one or more radio frequency transmitters within the service area, each transmitter connected to at least one corresponding source of digital data and configured to transmit digital data from that source in at least one transmit channel;

distributing one or more radio frequency repeaters within the service area, at least one repeater configured to receive a signal in at least one transmit channel and repeat that signal in at least one repetition channel;

distributing one or more radio frequency receivers within the service area, at least one receiver connected to at least one sink for digital data, the at least one receiver configurable to receive digital data from either a repetition channel or a transmit channel, that receiver selecting whether to receive digital data from the repetition channel or from the transmit channel.

37. A method of providing a wireless local area network in a defined service area, the method comprising:

distributing one or more radio frequency transmitters within the service area, each transmitter connected to at least one corresponding source of digital data and configured to transmit digital data from that source in at least one transmit channel;

distributing one or more radio frequency repeaters within the service area, at least one repeater configured to receive a signal in at least one transmit channel and repeat that signal in at least one repetition channel;

distributing one or more radio frequency receivers within the service area, at least one receiver connected to at least one sink for digital data and configured to receive digital data from at least one repetition channel; and transmitting digital data from one source of digital data, connected to one of the transmitters, to one sink for digital data, connected to one of the receivers, via at least one of the radio frequency repeaters, the at least one repeater configurable to receive a signal from either a first repetition channel or a transmit channel, selecting whether to retransmit a signal received in the transmit channel, or to retransmit a corresponding signal received in the first repetition channel in a second repetition channel.

38. The method of claim 37, wherein the at least one receiver is configurable to receive digital data from either the first or second repetition channel or a transmit channel, the method further comprising that receiver selecting whether to receive digital data from the first repetition channel, the second repetition channel, or from the transmit channel.

39. A method of operating a radio frequency repeater in a local area network, comprising:

selecting either a first signal, containing digital data, in a transmit channel, or a second signal, comprising a repetition of digital data from the first signal, in a first repetition channel;

when the first signal is selected, repeating digital data from the first signal in a repeat signal transmitted in the first repetition channel; and when the second signal is selected, repeating digital data from the second signal in a repeat signal transmitted in a second repetition channel.

40. The method of claim 39, wherein selecting comprises comparing signal strength in the transmit channel and in the first repetition channel, and selecting a signal corresponding to the one of these two channels having the largest signal strength.

* * * * *

UNITED STATES PATENT AND TRADEMARK OFFICE
CERTIFICATE OF CORRECTION

PATENT NO. : 6,690,657 B1
DATED : February 10, 2004
INVENTOR(S) : Lau et al.

It is certified that error appears in the above-identified patent and that said Letters Patent is hereby corrected as shown below:

Title page,
Item [56], References Cited, U.S. PATENT DOCUMENTS,
"6,041,065 A * 3/2000 Melvin …… 370/492" should be deleted.
Item [57], ABSTRACT, should include a final paragraph which reads
-- Various methods can be employed to make the channels substantially non-interfering, including frequency-division multiplexing, time-division multiplexing, code-division multiplexing, and combinations of these techniques. --.

Column 4,
Line 27, "network. The repeaters" should read -- network. ¶ The repeaters --.

Column 11,
Line 35, "comprising one or more" should read -- comprising: one or more --.

Column 13,
Line 2, "retransmits a signal" should read -- retransmits, in the second channel, a signal --.
Line 3, "first channel in the second channel and a second" should read -- first channel, and a second --.
Line 4, "retransmits a signal" should read -- retransmits, in a third channel, a signal --.
Line 5, "data received" should read -- data and received --.
Lines 5 and 6, "second channel in a third channel; and' should read -- second channel; and --.

Signed and Sealed this

Fourth Day of January, 2005

JON W. DUDAS
*Director of the United States Patent and Trademark Office*